US011865802B2

(12) United States Patent
Chen et al.

(10) Patent No.: US 11,865,802 B2
(45) Date of Patent: Jan. 9, 2024

(54) METHOD FOR MOLDING AND FORMING FLIP-FLOP AND MOLD THEREOF

(71) Applicant: OTRAJET INC., Taichung (TW)

(72) Inventors: Ching-Hao Chen, Taichung (TW); Liang-Hui Yeh, Taichung (TW)

(73) Assignee: OTRAJET INC., Taichung (TW)

( * ) Notice: Subject to any disclaimer, the term of this patent is extended or adjusted under 35 U.S.C. 154(b) by 0 days.

(21) Appl. No.: 17/546,749

(22) Filed: Dec. 9, 2021

(65) Prior Publication Data

US 2023/0144539 A1    May 11, 2023

(30) Foreign Application Priority Data

Nov. 9, 2021 (TW) ................................. 110141653

(51) Int. Cl.
*B29C 44/58*      (2006.01)
*B29D 35/02*      (2010.01)

(52) U.S. Cl.
CPC .............. *B29D 35/02* (2013.01); *B29C 44/58* (2013.01)

(58) Field of Classification Search
CPC .............. B29C 44/105; B29C 45/0025; B29C 2045/0018; B29C 44/58; B29C 44/582; B29D 35/0009; B29D 35/0018; B29D 35/122; B29D 35/02; A43B 3/106; B29L 2031/50
See application file for complete search history.

(56) References Cited

U.S. PATENT DOCUMENTS

2016/0331062 A1\* 11/2016 Liu ........................... A43B 3/12
2019/0389100 A1\* 12/2019 Lin ........................ B29C 44/588
2021/0276293 A1\* 9/2021 Baghdadi .............. A43D 119/00

FOREIGN PATENT DOCUMENTS

| CN | 209176025 | | 7/2019 | |
|---|---|---|---|---|
| CN | 209176025 U | \* | 7/2019 | ............. B29C 44/02 |
| TW | 202000427 | | 1/2020 | |
| TW | 202138158 | | 10/2021 | |
| TW | M626308 | | 5/2022 | |

OTHER PUBLICATIONS

CN-209176025-U Description ESpacenet Machine Translation with Line Numbers (Year: 2023).\*

\* cited by examiner

*Primary Examiner* — Emmanuel S Luk
*Assistant Examiner* — Anna J. Perkins
(74) *Attorney, Agent, or Firm* — Guice Patents PLLC

(57) ABSTRACT

A main technical feature of a method for molding and forming a flip-flop and a mold thereof provided by the invention is that when a polymer raw material is filled into a mold chamber space of the mold, the filled raw material is preferentially flowed in a direction of a strap area space used to mold a V-shaped strap portion of the flip-flop to ensure that the slender V-shaped strap portion of the flip-flop can be integrally formed.

9 Claims, 3 Drawing Sheets

METHOD FOR MOLDING AND FORMING FLIP-FLOP AND MOLD THEREOF

BACKGROUND OF THE INVENTION

Field of Invention

The invention relates to shoemaking technology, and more particularly to a method for molding and forming a flip-flop and a mold thereof.

Related Art

Flip-flop structurally comprises a sole and a slender V-shaped strap, due to the slender structure of the V-shaped strap, in the conventional technology of using polymer material as a raw material for manufacturing, it is difficult to integrally form the V-shaped strap on the sole in a single molding and forming process, and it is required to adopt different manufacturing processes to make the sole and the V-shaped strap separately, and then the sole and the V-shaped strap are assembled with each other through processing to complete a finished product of the flip-flop.

SUMMARY OF THE INVENTION

Therefore, a main object of the invention is to provide a method for molding and forming a flip-flop using a polymer raw material as a material, and a slender and elongated V-shaped strap of the flip-flop is integrally formed on a sole through a mold to eliminate an assembly process of secondary processing.

In order to achieve the above object, a main technical feature of the method for molding and forming the flip-flop provided by the invention is that when the polymer raw material is filled into a mold chamber space of the mold, the filled raw material is preferentially flowed in a direction of a strap area space used to mold a V-shaped strap portion of the flip-flop to ensure that the slender V-shaped strap portion of the flip-flop can be integrally formed.

In order to achieve the above method, the invention further provides a mold for molding and forming a flip-flop comprising a first mold plate and a second mold plate used to form a multi-piece mold body, a mold chamber defined by the first mold plate and the second mold plate overlapping and connecting to each other in a mold clamping state, and three material filling channels separately provided on the first mold plate to communicate with the mold chamber, a polymer raw material externally provided is capable of entering the mold chamber through the material filling channels to be reacted, foamed, molded and formed by the mold chamber into a finished product of the flip-flop.

In order to mold the required flip-flop, the mold chamber is divided into a sole area shaped like the flip-flop sole, a strap area shaped like the slender and elongated V-shaped strap of the flip-flop, and three hole-shaped connecting areas communicating with the sole area and the strap area respectively and corresponding to positions of three end points of the V-shape, and an outlet orifice of each of the material filling channels located on a chamber wall of the mold chamber is respectively facing toward each of the three connecting areas, thereby, when the polymer raw material externally provided and pushed by an external force enters the mold chamber through each of the outlet orifices, the polymer raw material entering the mold chamber can be first accumulated in the connecting areas or their adjacent areas due to the above-mentioned relative positions, so that the polymer raw material is capable of smoothly entering a space of the strap area, and the space of the strap area can be fully filled with the polymer raw material.

On the other hand, the above disclosed method can also be carried out with the assistance of the technique of back-pressure foaming and forming, that is, before the polymer raw material is filled, a back-pressure gas is filled into the mold chamber of the mold for molding and forming the flip-flop in the mold clamping state, so that inside the mold chamber is filled with the gas with a predetermined pressure value, and then the above-mentioned polymer raw material filling procedure is carried out. After filling of a rated amount of the polymer raw material is completed, the back-pressure gas is vented from the mold while the polymer raw material is foaming, and foaming is completed while the back pressure disappears.

Wherein, the mold for molding and forming the flip-flop further comprises at least one gas channel capable of being controlled to open and close to be served as a flow channel for the back-pressure gas to enter and exit the mold chamber.

Further, a quantity of the gas channel can be set to more than one, the gas channels can be divided into a first set communicating with the sole area and a second set communicating with the strap area, thereby when the back-pressure gas is vented in the method for molding and forming the flip-flop, the back-pressure gas located in the strap area can be vented first through the second set of the gas channels, so that a back pressure value of the gas in the strap area reduces or reaches a vacuum level, in this way, through a difference in back pressure values between the sole area space and the strap area space, the polymer raw material located in the sole area of a higher pressure value can be pushed to move to the space of the strap area of a lower pressure value to ensure that the strap area can be fully filled with the polymer raw material, and then all the back-pressure gas still remaining in the mold chamber is vented to proceed with foaming.

DETAILED DESCRIPTION OF THE INVENTION

Figure 1:
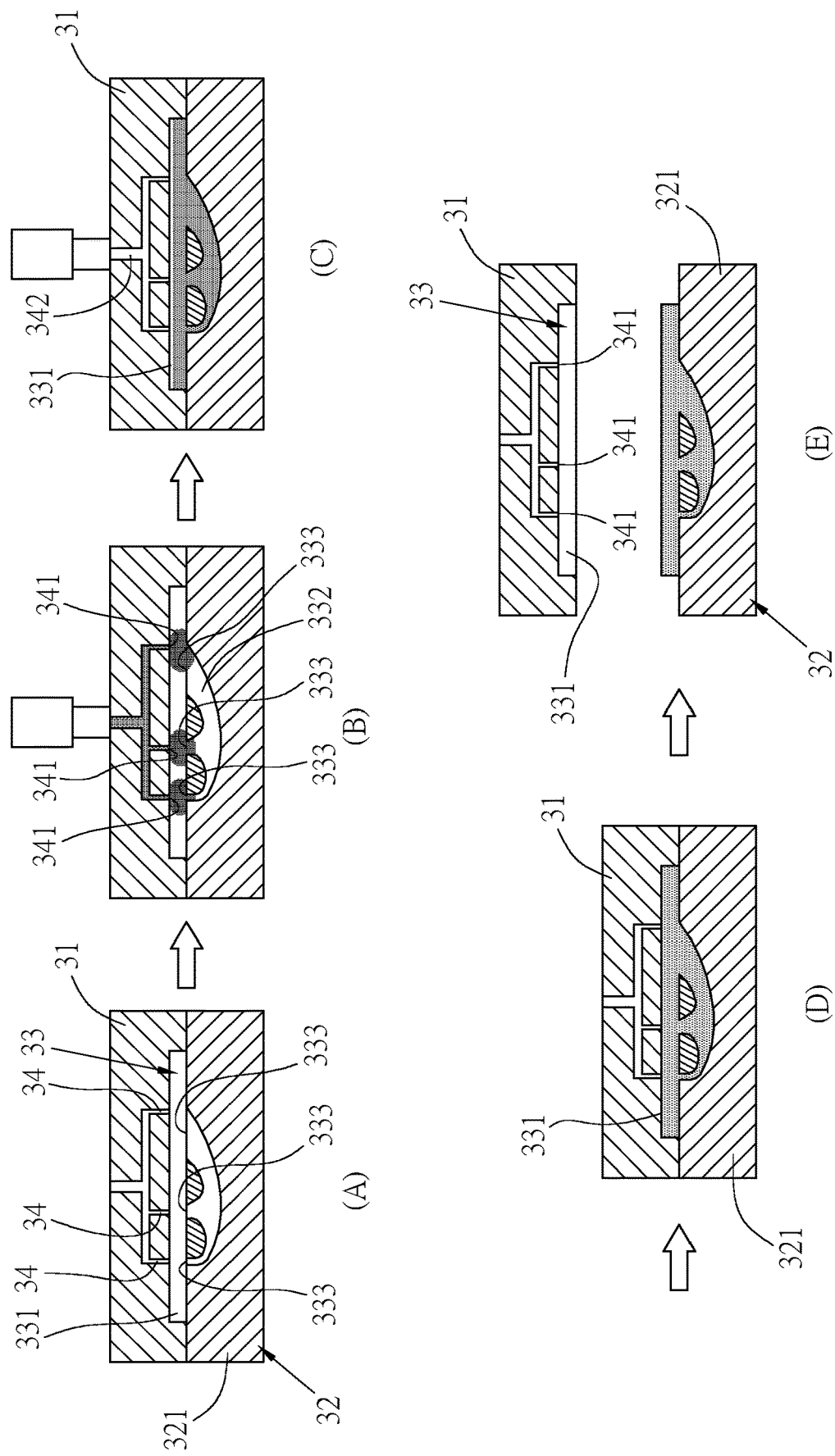
FIG. 1 is flow diagrams of a preferred embodiment of the invention.
Figure 2:
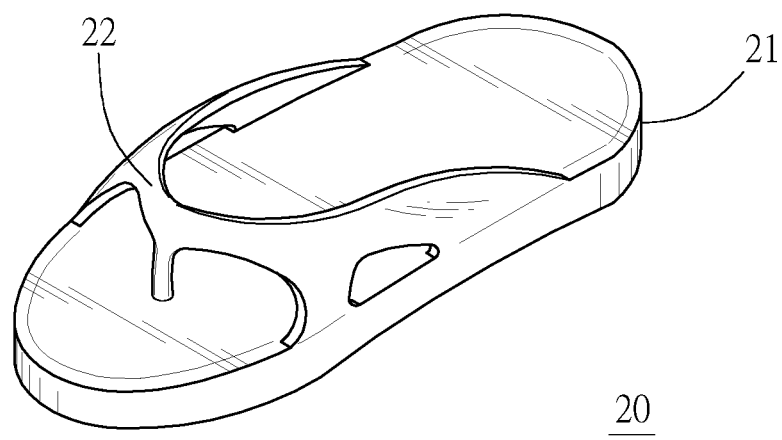
FIG. 2 is a perspective view of a flip-flop made according to a preferred embodiment of the invention.
Figure 3:
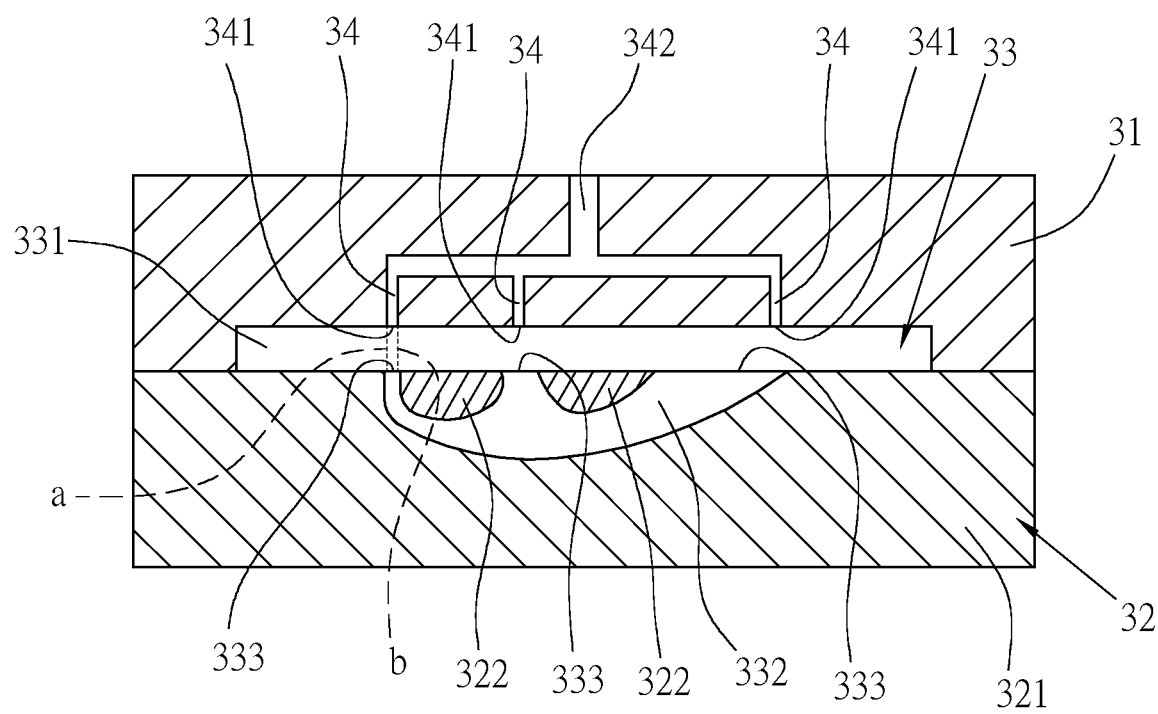
FIG. 3 is a cross-sectional view of a mold according to a preferred embodiment of the invention.

Please refer to FIG. 1, a method 10 for molding and forming a flip-flop provided in a preferred embodiment of the invention is used to manufacture a flip-flop 20 as shown in FIG. 2, and is performed by a mold 30 for molding and forming a flip-flop as shown in FIG. 3.

Figure 4:
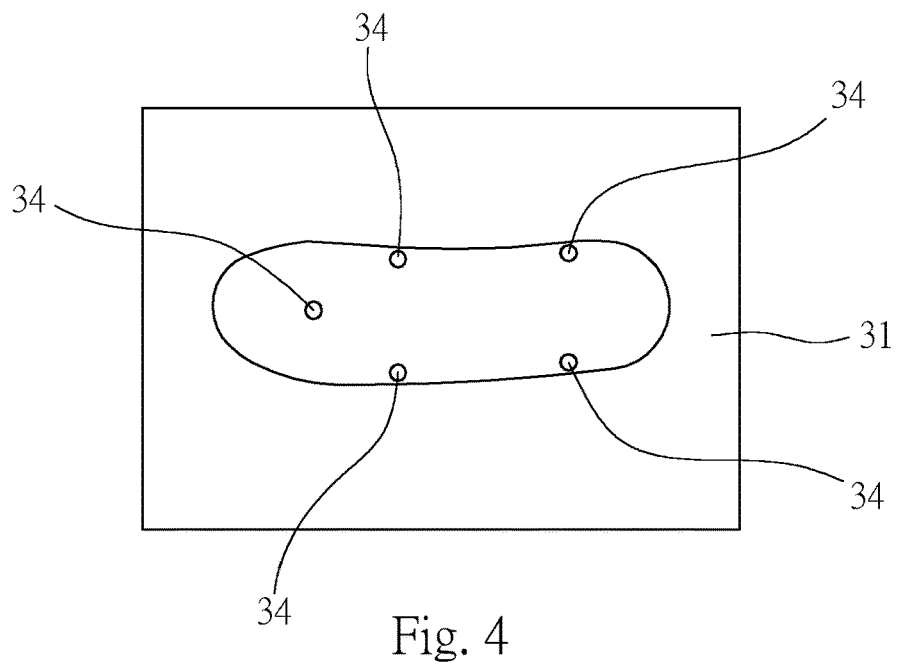
FIG. 4 is a top view of the mold according to a preferred embodiment of the invention.

Please refer to FIGS. 3 and 4, the mold 30 for molding and forming the flip-flop is a multi-layer mold, and comprises a first mold plate 31 and a second mold plate 32 with an appropriate thickness respectively, a mold chamber 33 defined by the first mold plate 31 and the second mold plate 32, and three hole-shaped material filling channels 34.

The first mold plate 31 and the second mold plate 32 are capable of displacing relative to each other between a mold clamping position when overlapping and connecting with each other as shown in FIG. 3 and a mold opening position when separating and spaced apart from each other under application of an external force, and the first mold plate 31 and the second mold plate 32 located at the mold clamping position jointly define the mold chamber 33 in a closed state between the first mold plate 31 and the second mold plate 32.

The mold chamber 33 has a spatial shape the same as that of the flip-flop 20 as shown in FIG. 2, and is divided into a sole area 331 corresponding to a shape of a sole 21 of the flip-flop 20 and located between the first mold plate 31 and the second mold plate 32, a strap area 332 corresponding to a slender and elongated V-shaped strap 22 of the flip-flop 20 and located in the second mold plate 32, and three hole-shaped connecting areas 333 corresponding to positions of three end points of a V-shape of the strap area 332 and middle parts thereof and located on the second mold plate 32 to communicate with the sole area 331.

Wherein, in order to facilitate taking out a molded product, the second mold plate 32 used to define the strap area 332 can be composed of a mold body 321 and a mold core 322; however, the technical content related to the mold core 322 provided in the mold 30 is a commonly known technical content, and is not the technical feature of the invention, so it will not be redundantly described here; but any person having ordinary skill in the art to which the invention pertains can easily complete the mold structure used to define the mold chamber 33 based on the general knowledge at the time of application of the invention.

Each of the material filling channels 34 is respectively disposed on the first mold plate 31, and an outlet orifice 341 of each of the material filling channels 34 is respectively formed on a chamber wall of the mold chamber 33 to communicate the material filling channels 34 with the mold chamber 33, and each of the outlet orifices 341 is respectively facing toward each of the connecting areas 333.

Further, a virtual outlet area (a) extending along a hole axis of each of the outlet orifices 341 in a direction of the mold chamber 33 respectively forms an intersection with a virtual connecting area (b) extending along a hole axis of each of the corresponding connecting areas 333 in a direction of the sole area 331 within a spatial boundary of the sole area 331, and a boundary of the intersection can be further expanded to a coaxial overlapping state as shown in FIG. 3.

The method 10 for molding and forming the flip-flop using the mold 30 for molding and forming the flip-flop comprises steps of:

step A: adopting the mold 30 for molding and forming the flip-flop;

step B: as shown in FIG. 3(A), positioning the mold 30 for molding and forming the flip-flop at a mold clamping position;

step C: pushing a rated amount of a polymer raw material by an acting force applied externally to converge the polymer raw material at an inlet orifice 342 located on a top side of the first mold plate 31 before entering each of the material filling channels 34 respectively, and then the polymer raw material entering the mold chamber 33 through each of the outlet orifices 341, by means of corresponding positions between each of the outlet orifices 341 and each of the connecting areas 333, at the beginning of entering the mold chamber 33, the polymer raw material being capable of converging in the connecting areas 333 and areas surrounding the connecting areas 333 as shown in FIG. 3(B), so that the polymer raw material entering the mold chamber 33 being capable of flowing toward the strap area 332 through each of the connecting areas 333 before filling the sole area 331 to preferentially fill a space of the strap area 332 fully and then fill the sole area 331 after filling the entire space of the strap area 332 to complete filling of the rated amount of the polymer raw material as shown in FIG. 3(C); wherein, the technical means used to fill the polymer raw material into the mold chamber 33 can be a conventional filling device; however, the injection technique is a basic technical content generally well-known to those having ordinary skill in the art to which the invention pertains, and is not the technical feature of the invention, so it will not be redundantly described here; and step D: after foaming, molding and forming of the filled polymer raw material in the mold chamber 33 as shown in FIG. 3(D), opening the mold 30 for molding and forming the flip-flop to a mold opening position as shown in FIG. 3(E) before taking out a finished product of the formed flip-flop 20.

Thereby, the method 10 for molding and forming the flip-flop is capable of ensuring that the slender and elongated V-shaped strap 22 and the block-shaped sole 21 of the flip-flop 20 can be integrally molded and formed into a finished product in a single molding to eliminate the need for separate manufacturing and additional assembly processing in the conventional technique, and capable of ensuring a stable quality of the formed flip-flop 20.

In addition, there are two more points that need to be further explained and clarified.

Firstly, in the method 10 for molding and forming the flip-flop and the mold 30 for molding and forming the flip-flop, although coaxial configuration between each of the outlet orifices 341 and each of the connecting areas 333 is disclosed as an optimal state, but its industrial use is not limited thereto. As long as an efficacy of the filled polymer raw material being capable of entering the strap area 332 preferentially can be achieved by the guiding the filled polymer raw material through each of the outlet orifices 341 to cause the polymer raw material to be adjacent to each of the connecting areas 333 when entering the mold chamber 33, such technical means or method or device falls within the scope covered by the technical features of the invention.

Secondly, performing of the method 10 for molding and forming the flip-flop can be assisted by adopting the technical means of back-pressure molding. The specific back-pressure molding technical content is already disclosed by the prior art, and therefore, only the parts related to the technical features of the invention will be described hereinafter.

Figure 5:
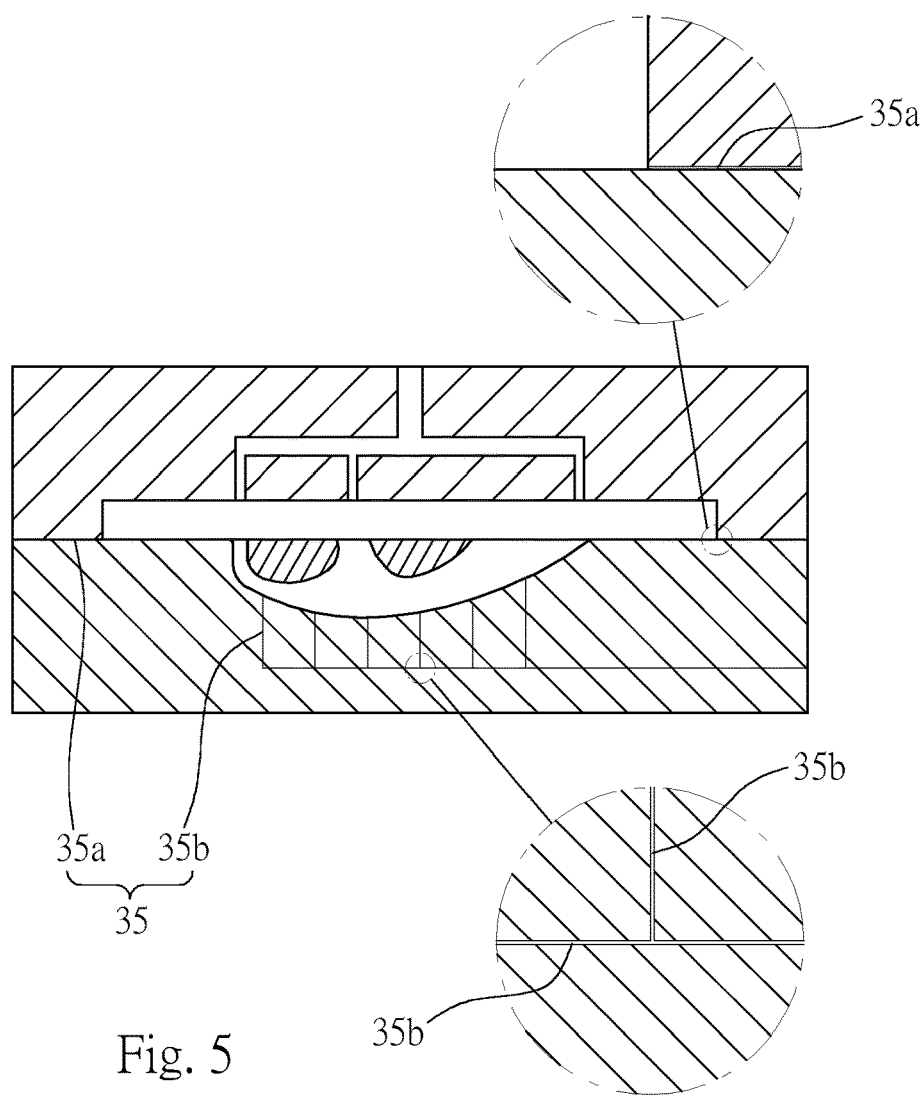
FIG. 5 is a cross-sectional view of the mold provided with gas channels according to a preferred embodiment of the invention.

As shown in FIG. 5, in order to form a back pressure in the mold chamber 33, the mold 30 needs to have a plurality of gas channels 35 that can be used as gas flow channels, and the gas channels 35 are divided into a first set 35a communicating with the sole area 331 and a second set 35b communicating with the strap area 332, and opening and closing of each of the gas channels 35 can be controlled; however, the control technique for opening and closing of the gas channels 35 is a conventional technology, so it will not be repeated here.

In the method 10 for molding and forming the flip-flop using the mold 30 shown in FIG. 5, a back-pressure gas is filled into the mold chamber 33 through each of the gas channels 35 before performing the step C, a pressure formed by the gas filled into the mold chamber 33 causes a back pressure on the polymer raw material that subsequently enters the mold chamber 33, and prevents the polymer raw material from foaming during filling.

The back pressure is continuously maintained until foaming in the step D, that is, while the polymer raw material of the step D is foamed, the back-pressure gas that causes the back pressure is synchronously vented from the mold chamber 33, and the polymer raw material can be foamed while the back pressure disappears.

Wherein, in addition to the method of venting all the back-pressure gas in a single time as described above, another method of venting in stages can also be used.

In the method of venting the back-pressure gas in stages, the gas channels 35 of the second set 35b are opened, the back-pressure gas located in the strap area 332 is vented first, and then the back-pressure gas located in the sole area 331 is vented. Due to a time difference of venting, a difference in pressure values is generated between the sole area 331 and the strap area 332, with the pressure difference, the polymer raw material is pushed from the sole area 331 to the strap area 332 to ensure that the polymer raw material is capable of filling the entire space of the strap area 332 fully to maintain a good quality of a finished product. Wherein, in a step of the first stage of venting the back-pressure gas from the strap area 332, an extent of a pressure reduction is not limited to achieving a vacuum level of full venting. Even though a part of the back-pressure gas still remains, it is still sufficient to form the above pressure difference to ensure an integrity of the V-shaped strap 22 after molding and forming.

It is to be understood that the above description is only the embodiments of the invention and is not used to limit the present invention, and changes in accordance with the concepts of the present invention may be made without departing from the spirit of the present invention. For example, the equivalent effects produced by various transformations, variations, modifications and applications made to the configurations or arrangements shall still fall within the scope covered by the appended claims of the present invention.

What is claimed is:

1. A method for molding and forming a flip-flop comprising following steps of:
    step A: adopting a mold for molding and forming the flip-flop, the mold having a mold chamber being shaped as the flipflop and divided into a sole area corresponding to a shape of a sole of the flip-flop, a strap area corresponding to a shape of an elongated V-shaped strap of the flip-flop, and three hole-shaped connecting areas communicating with the sole area and the strap area respectively and corresponding to positions of three end points of the V-shaped strap;
    step B: positioning a mold for molding and forming the flip-flop at a mold clamping position;
    step C: filling a rated amount of a polymer raw material into the mold chamber, the polymer raw material flowing downwardly through outlet orifices into the sole area of the mold chamber and flowing from the sole area through the three hole-shaped connecting areas into a space of the strap area, the space of the strap area being filled entirely with the polymer raw material before the sole area being filled entirely with the polymer raw material; and
    step D: after reacting, foaming and forming of the filled polymer raw material in the mold chamber, opening the mold for molding and forming the flip-flop and taking out a finished product of the flip-flop;
    wherein the finished product of the flip-flop being formed with a sole and a V-shaped strap, the V-shaped strap being a single piece integrally formed with the sole and having three end points connected to the sole.

2. The method for molding and forming the flip-flop as claimed in claim 1, wherein before performing the step C, filling a back-pressure gas into the mold chamber to form a back pressure in the mold chamber, and while foaming the polymer raw material in the step D, venting all the back-pressure gas out of the mold chamber synchronously to remove the back pressure in the mold chamber and performing foaming synchronously.

3. The method for molding and forming the flip-flop as claimed in claim 2, wherein in the step D of venting the back-pressure gas, venting the back-pressure gas located in the strap area first, the polymer raw material accumulating around orifices of the connecting areas blocking the back-pressure gas in the sole area from entering the strap area to reduce a back pressure value of the strap area or reduce it to vacuum, thereby causing a pressure value of the strap area to be less than a back pressure value of the sole area, a pressure difference between the strap area and the sole area forcing the polymer raw material to flow from the sole area to a slender and elongated space of the strap area, venting the gas in the sole area after filling the strap area fully with the polymer raw material, and then venting all the back-pressure gas out of the mold chamber.

4. The method for molding and forming the flip-flop as claimed in claim 3, wherein the polymer raw material comprises a foaming agent.

5. The method for molding and forming the flip-flop as claimed in claim 4, wherein the foaming agent is a supercritical fluid.

6. The method for molding and forming the flip-flop as claimed in claim 2, wherein the polymer raw material comprises a foaming agent.

7. The method for molding and forming the flip-flop as claimed in claim 6, wherein the foaming agent is a supercritical fluid.

8. The method for molding and forming the flip-flop as claimed in claim 1, wherein the polymer raw material comprises a foaming agent.

9. The method for molding and forming the flip-flop as claimed in claim 8, wherein the foaming agent is a supercritical fluid.

* * * * *